US009088455B2

(12) United States Patent
Liu et al.

(10) Patent No.: US 9,088,455 B2
(45) Date of Patent: Jul. 21, 2015

(54) OFDM OR OFDMA SIGNALING FOR RANGING AND DATA

(71) Applicant: BROADCOM CORPORATION, Irvine, CA (US)

(72) Inventors: Hong Liu, Irvine, CA (US); Avi Kliger, Ramat Gan, IL (US); Jeffrey S. Putnam, Irvine, CA (US); Leo Montreuil, Atlanta, GA (US); Jonathan S. Min, Newport Coast, CA (US); Ravi Rajagopal, Costa Mesa, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/104,044

(22) Filed: Dec. 12, 2013

(65) Prior Publication Data

US 2014/0177741 A1   Jun. 26, 2014

Related U.S. Application Data

(60) Provisional application No. 61/740,051, filed on Dec. 20, 2012, provisional application No. 61/889,086, filed on Oct. 10, 2013, provisional application No. 61/911,878, filed on Dec. 4, 2013.

(51) Int. Cl.
*H04L 27/28* (2006.01)
*H04B 17/00* (2006.01)
*H04L 29/06* (2006.01)
*H04L 27/26* (2006.01)

(52) U.S. Cl.
CPC ........ *H04L 29/0653* (2013.01); *H04L 27/2602* (2013.01); *H04L 27/2626* (2013.01)

(58) Field of Classification Search
CPC ................ H04L 27/2647; H04L 5/0007
USPC ......... 375/260, 226, 269, 295; 370/208, 320, 370/329
See application file for complete search history.

(56) References Cited

U.S. PATENT DOCUMENTS

| 2007/0041459 | A1* | 2/2007 | Yeon et al. | 375/260 |
|---|---|---|---|---|
| 2010/0054115 | A1* | 3/2010 | Roh et al. | 370/208 |
| 2010/0110873 | A1* | 5/2010 | Han et al. | 370/208 |
| 2011/0131464 | A1* | 6/2011 | Ko et al. | 714/752 |

* cited by examiner

*Primary Examiner* — Khai Tran
(74) *Attorney, Agent, or Firm* — Garlick & Markison; Shayne X. Short (57) ABSTRACT

A communication device is operative to generate and orthogonal frequency division multiplexing (OFDM) symbol that includes one or more data and ranging modulation symbols. The data and ranging modulation symbols may be included within different sub-carriers of the OFDM symbol. The OFDM symbol is used to generate an OFDM symbol pair in the frequency domain (FDOM). After conversion from the FDOM to the time domain (TDOM), the OFDM symbol pair may then undergoes post-processing in the TDOM before transmission. Such post-processing may include the addition of cyclic prefix (CP) and cyclic suffix (CS) to the OFDM symbol pair in the TDOM as well as filtering using a window function. The OFDM symbol may be generated as an orthogonal frequency division multiple access (OFDMA) symbol, and two were more OFDM symbols or OFDMA symbols may be arranged in a frame.

20 Claims, 9 Drawing Sheets

OFDM OR OFDMA SIGNALING FOR RANGING AND DATA

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional Patent Applications which are hereby incorporated herein by reference in their entirety and made part of the present U.S. Utility patent application for all purposes:

1. U.S. Provisional Patent Application Ser. No. 61/740,051, entitled "Preamble design for upstream ranging," filed Dec. 20, 2012, pending.

2. U.S. Provisional Patent Application Ser. No. 61/889,086, entitled "OFDMA frame for ranging and data," filed Oct. 10, 2013, pending.

3. U.S. Provisional Patent Application Ser. No. 61/911,878, entitled "OFDM or OFDMA signaling for ranging and data," filed Dec. 4, 2013, pending.

BACKGROUND

1. Technical Field

The present disclosure relates generally to communication systems; and, more particularly, to ranging within such communication systems.

2. Description of Related Art

Data communication systems have been under continual development for many years. The primary goal within such communication systems is to transmit information successfully between devices. Communications between devices can be governed by a number of operational parameters. Ranging is a process by which characteristics of the communication pathway between first and second communication devices can be determined.

A first communication device transmits a ranging signal to a second communication device, and the second communication device processes the ranging signal to determine one or more characteristics of the communication pathway between the first and second communication devices. Then, the second communication device communicates with the first communication device using one or more operational parameters that are selected based on the one or more characteristics of that communication pathway. Examples of such operational parameters may relate to transmission power and timing based on the distance between the first and second communication devices as well as any particular characteristics of the communication pathway between them.

DETAILED DESCRIPTION

Figure 1A:
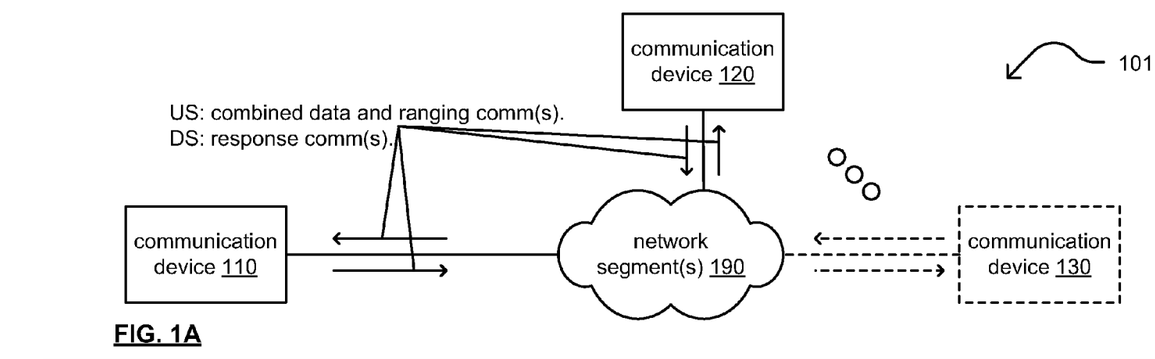
FIG. 1A is a diagram illustrating an embodiment of one or more communication systems.

FIG. 1A is a diagram illustrating an embodiment 101 of one or more communication systems. One or more network segments 190 provide communication inter-connectivity for at least two communication devices 110 and 120. Generally speaking, any desired number of communication devices are included within one or more communication systems (e.g., as shown by communication device 130). Some or all the various communication devices 110-130 include capability to generate a ranging signal for transmission to another one of the devices 110-130. From the perspective of a given device, such as device 110, one or more signals that include combined data and ranging information may be transmitted upstream (US) to another one of the devices 110-130. A recipient device, such as device 120, is configured to process the received signal and transmit one or more response signals downstream (DS) to the device 110. Generally, the recipient device (e.g., device 120) uses the ranging information to determine one or more operational parameters by which communications may be made with the transmitting device (e.g., device 110).

The various communication links within the one or more network segments 190 may be implemented using any of a variety of communication media including communication links implemented as wireless, wired, optical (e.g., including fiber-optic), satellite, microwave, etc. communication links. Also, in some instances, communication links of different types may cooperatively form a connection pathway between any two communication devices. Considering one possible example, a communication pathway between devices 110 and 120 may include some segments of wired communication links and other segments of optical communication links. Note also that the devices 110-130 may be of a variety of types of devices including stationary devices, mobile devices, portable devices, etc. and may support communications for any of a number of services or service flows including data, telephony, television, Internet, media, synchronization, etc.

In an example of operation, device 110 includes a communication interface to support communications with one or more of the other devices 120-130. This communication may be bidirectional/to and from the one or more of the other devices 120-130 or unidirectional (or primarily unidirectional) from the one or more of the other devices 120-130.

Device 110 may be implemented to include a processor and the communication interface. The processor is configured to generate one or more orthogonal frequency division multiplexing (OFDM) symbol(s) that include data modulation symbol(s) within first sub-carrier(s) and ranging modulation symbol(s) within second sub-carrier(s). The processor is configured perform a majority of such processing in the frequency domain (FDOM). By generating resultant OFDM symbol(s) that include both data and ranging information in the FDOM, the processor is configured to perform a single conversion of such resultant OFDM symbol(s) from the FDOM to the time domain (TDOM). For example, the processor may be configured to perform first operations to generate an OFDM symbol pair using an OFDM symbol that includes both data and ranging information in the FDOM, then perform an inverse fast Fourier transform (IFFT) operation to convert from the FDOM to the TDOM, and then perform second operations in the TDOM to generate a final signal to be transmitted.

In an example of operation, device 120 receives first one or more ranging signals from device 110 and second one or more ranging signals from device 130. Device 120 then processes those ranging signals to determine one or more characteristics of a first communication pathway between devices 110 and 120 and a second communication pathway between devices 120 and 130. Device 120 can select one or more operational parameters for use in subsequent communications with devices 110 and 130. Such operational parameters may be related to transmission power and timing of such communications.

Figure 1B:
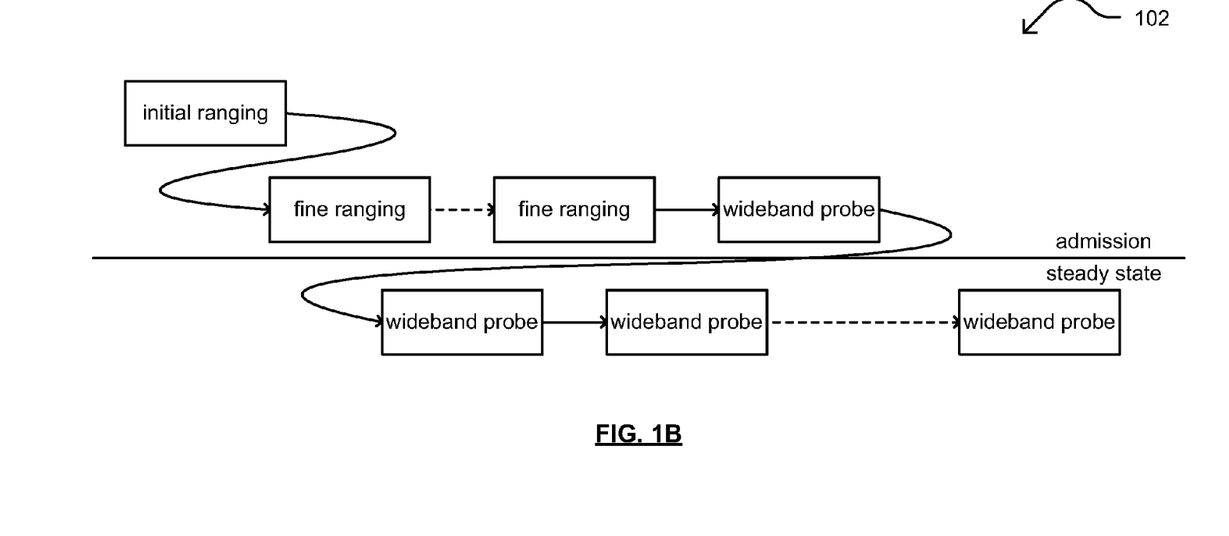
FIG. 1B is a diagram illustrating an example of ranging signaling within one or more communication systems.

FIG. 1B is a diagram illustrating an example 102 of ranging signaling within one or more communication systems. A first device (e.g., communication device 110) transmits a ranging signal to a second device (e.g., communication device 120). The ranging process may be viewed as being divided into multiple steps. In a first step, initial ranging is used by a headend or upstream (US) communication device (e.g., communication device 120 or a cable modem termination system (CMTS) as described with reference to FIG. 2) to identify a new admitting downstream (DS) communication device (e.g., communication device 110 or cable modem (CM) as described with reference to FIG. 2) and for coarse power and timing ranging. Fine ranging is then used after initial ranging has been completed, to fine-tune timing and power. Wideband probing is used during admission of the DS communication device and steady state operation for pre-equalization configuration and periodic transmit (TX) power and time-shift ranging.

The headend or upstream US communication device uses the received ranging signals to determine one or more characteristics of a communication pathway between it and the new admitting downstream DS communication device, and then may select one or more operational parameters to govern subsequent communications based on those one or more characteristics. Generally, the ranging process is a step-by-step process by which a new device is admitted and registered to the communication system to support subsequent communications with one or more other devices in the system.

Figure 2:
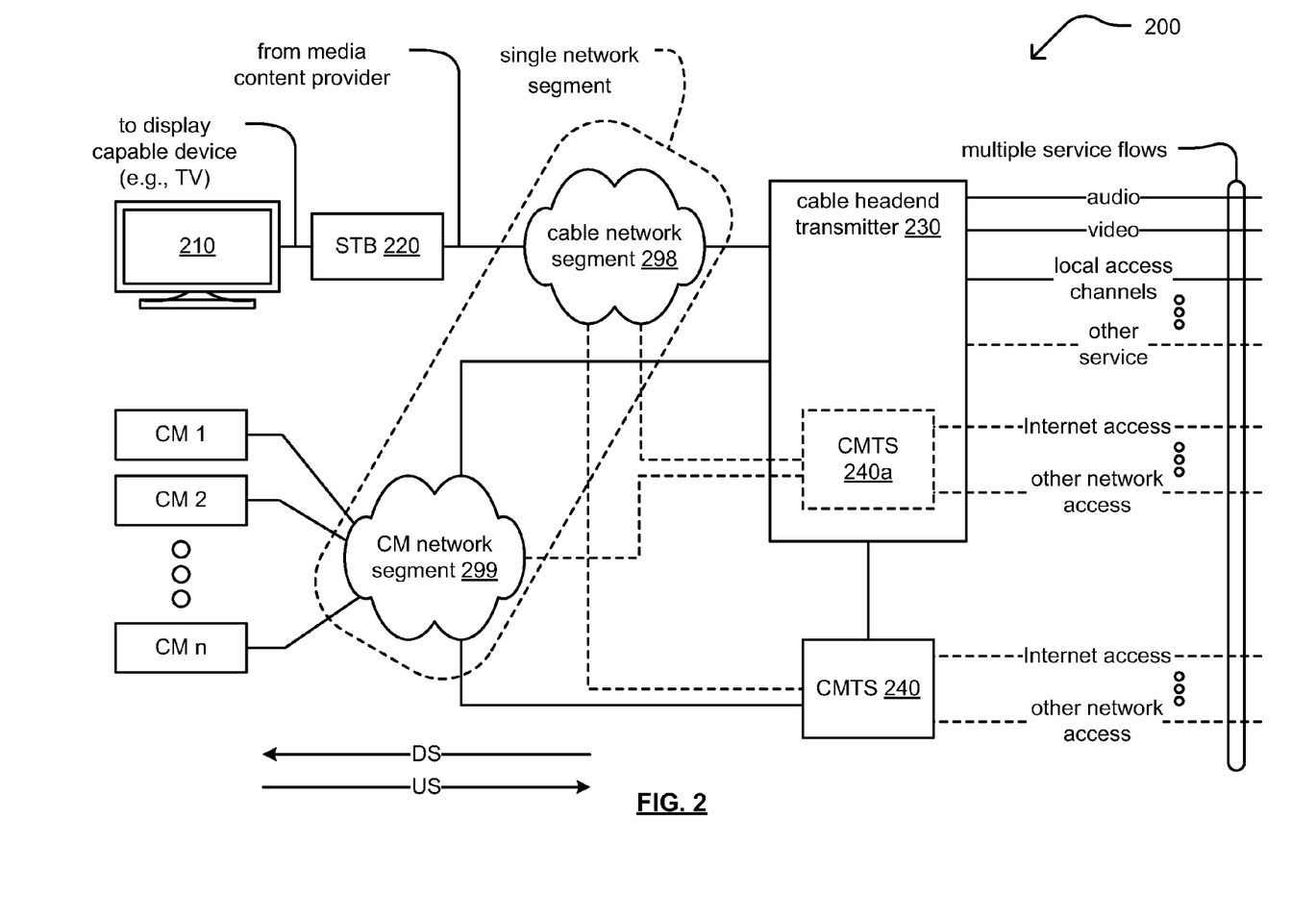
FIG. 2 is a diagram illustrating another embodiment of one or more communication systems.

FIG. 2 is a diagram illustrating another embodiment 200 of one or more communication systems. A cable headend transmitter 230 provides service to a set-top box (STB) 220 via cable network segment 298. The STB 220 provides output to a display capable device 210. The cable headend transmitter 230 can support any of a number of service flows such as audio, video, local access channels, as well as any other service of cable systems. For example, the cable headend transmitter 230 can provide media (e.g., video and/or audio) to the display capable device.

The cable headend transmitter 230 may provide operation of a cable modem termination system (CMTS) 240*a*. For example, the cable headend transmitter 230 may perform such CMTS functionality, or a CMTS may be implemented separately from the cable headend transmitter 230 (e.g., as shown by reference numeral 240). The CMTS 240 can provide network service (e.g., Internet, other network access, etc.) to any number of cable modems (shown as CM 1, CM 2, and up to CM n) via a cable modem (CM) network segment 299. The cable network segment 298 and the CM network segment 299 may be part of a common network or common networks. The cable modem network segment 299 couples the cable modems 1-n to the CMTS (shown as 240 or 240*a*). Such a cable system (e.g., cable network segment 298 and/or CM network segment 299) may generally be referred to as a cable plant and may be implemented, at least in part, as a hybrid fiber-coaxial (HFC) network (e.g., including various wired and/or optical fiber communication segments, light sources, light or photo detection complements, etc.).

A CMTS 240 (or 240*a*) is a component that exchanges digital signals with cable modems 1-n on the cable modem network segment 299. Each of the cable modems is coupled to the cable modem network segment 299, and a number of elements may be included within the cable modem network segment 299. For example, routers, splitters, couplers, relays, and amplifiers may be contained within the cable modem network segment 299. Generally speaking, downstream information may be viewed as that which flows from the CMTS 240 to the connected cable modems (e.g., CM 1, CM 2, etc.), and upstream information as that which flows from the cable modems to the CMTS 240.

Any of the various communication devices within the embodiment 200 may be configured to include a processor that is configured to generate a ranging signal that includes both data and ranging information. The processor may be configured to perform certain operations in the frequency domain (FDOM) and other operations in the time domain (TDOM). For example, the processor may be configured to generate one or more OFDM symbols that include data modulation symbols and ranging modulation symbols may be generated in the FDOM. The processor may also be configured to perform duplication of such an OFDM symbol that includes both data and ranging information in the FDOM to generate an FDOM OFDM symbol pair. Then, the processor may be configured to convert the FDOM OFDM symbol pair from the FDOM to the TDOM to generate a TDOM OFDM symbol pair. The processor may then be configured to perform one or more subsequent processing operations on the TDOM OFDM symbol pair.

In an example operation, the various cable modems 1, 2, and so on up to n, may be configured to transmit ranging signals to an upstream (US) communication device such as the cable headend transmitter 230 or CMTS 240. The US communication device then processes the ranging signals to determine one or more characteristics of communication pathways between it and the cable modems 1-n. The US communication device then selects one or more operational parameters to govern subsequent communications with the cable modems 1-n based on those one or more characteristics.

Also, a ranging signal sent from any one of the cable modems 1-n can be used to identify the particular cable modem that transmitted the ranging signal. For example, a given cable modem may select a particular preamble sequence to identify that cable modem from the other cable modems. As such, the US communication device may appropriately select one or more operational parameters for subsequent communications to a particular cable modem. The US communication device may also select different operational parameters for subsequent communications to each of the respective cable modems 1-n.

Figure 3A:
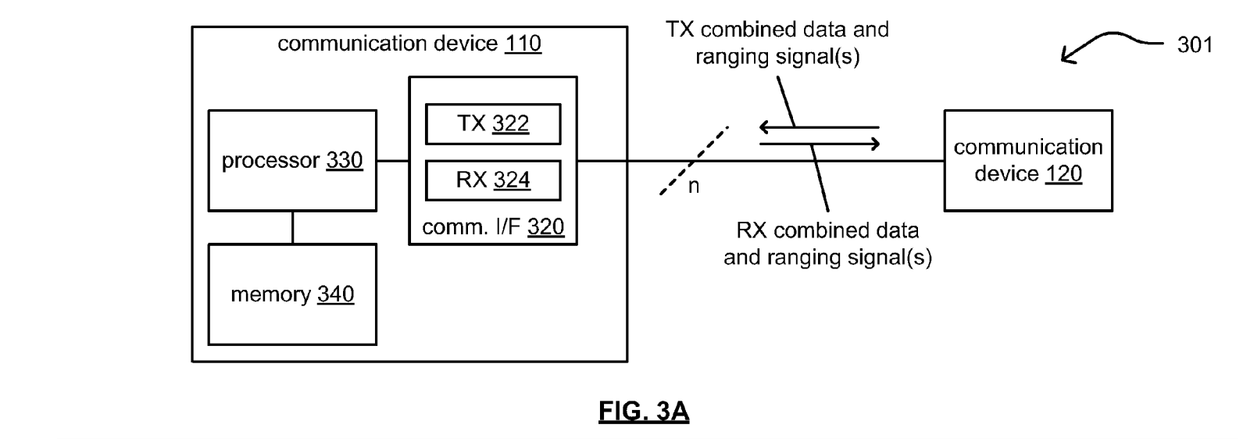
FIG. 3A is a diagram illustrating an example of communication device that is operative within one or more communication systems.

FIG. 3A is a diagram illustrating an example 301 of the communication device 110 that is operative within one or more communication systems. The device 110 includes a communication interface 320 and a processor 330. The communication interface 320 includes functionality of a transmitter 322 and the receiver 324 to support communications with one or more other devices within a communication system. The device 110 may also include memory 340 to store information including signals that include ranging and/or data information generated by the device 110 or such information received from other devices via one or more communication channels. Memory 340 may also include and store various operational instructions for use by the processor 330 in regards to generation of signals that include ranging and/or data information described herein.

In one implementation, the processor 330 is configured to generate an orthogonal frequency division multiplexing (OFDM) symbol that includes one or more data modulation symbols within first one or more sub-carriers and one or more ranging modulation symbols within second one or more sub-carriers. The processor 330 then generates, in the frequency domain (FDOM), a frequency domain OFDM symbol pair using the OFDM symbol and a duplicate of the OFDM symbol. The processor 330 then converts the frequency domain OFDM symbol pair to a time domain OFDM symbol pair (e.g., using a single inverse fast Fourier transform (IFFT) process). In the time domain (TDOM), the processor 330 then pre-pends a cyclic prefix to and post-pends a cyclic suffix to the time domain OFDM symbol pair to generate a modified time domain OFDM symbol pair. The processor 330 then filters the modified time domain OFDM symbol pair using a window function to generate a filtered time domain OFDM symbol pair. The communication interface 320 is configured to support communications to and from one or more other devices (e.g., communication device 120) and is configured to transmit the filtered time domain OFDM symbol pair.

Note that the processor 330 is configured to generate an OFDM symbol pair that includes both ranging and data information. The processor 330 may be configured to generate another OFDM symbol pair that includes only data information without any ranging information. The processor 330 may be configured to generate an OFDM frame that includes multiple OFDM symbol pairs such that some of the OFDM symbol pairs include both ranging and data information while other of the OFDM symbol pairs include only data information.

Figure 3B:
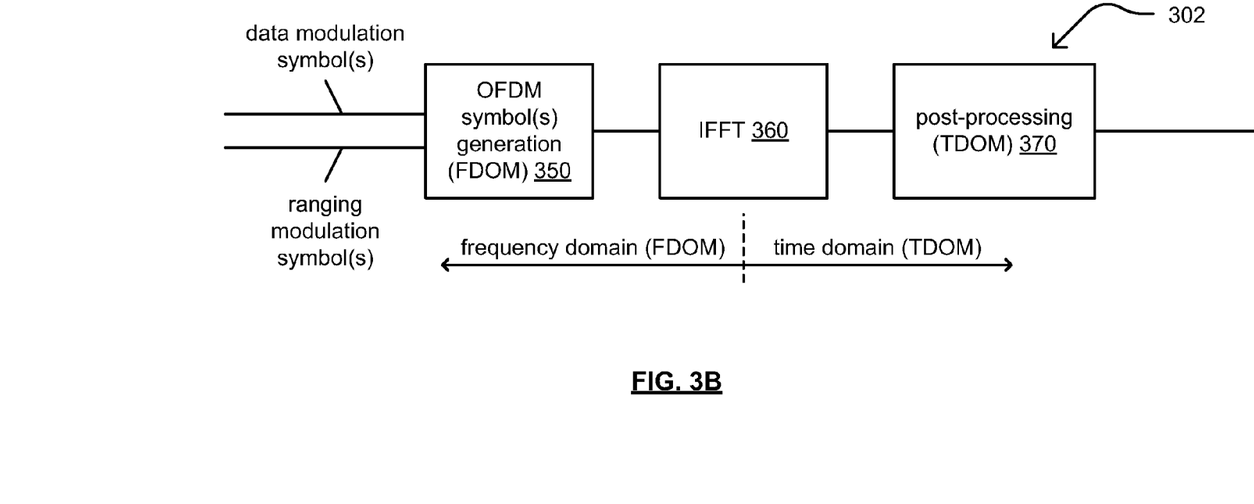
FIG. 3B is a diagram illustrating another example of the communication device that is operative within one or more communication systems.

FIG. 3B is a diagram illustrating another example 302 of the communication device 110 that is operative within one or more communication systems. Communication device 110 (e.g., cable modem) may be configured to operate based on a media access control (MAC) protocol capable to transmit fine ranging and data modulation symbols on or in the same orthogonal frequency division multiplexing (OFDM) or orthogonal frequency division multiple access (OFDMA) symbol. Also, more than one OFDM symbol may be arranged in an OFDM frame, or more than one OFDMA symbol may be arranged in an OFDMA frame. OFDMA is a particular implementation of OFDM as described below, and general reference to OFDM includes OFDMA.

An OFDM symbol (or frame) may be generated by processing performed in either the frequency domain (FDOM) or the time domain (TDOM). In some instances, when communication device 110 is implemented to perform certain operations in the time domain (TDOM), the communication device 110 may incur a significant increase of complexity that can also increase the cost of such a device. Communication device 110 may be implemented to perform selected operations in the frequency domain (FDOM) instead of in the time domain (TDOM) to have relatively less complexity than performing all of operations in the time domain (TDOM).

In this diagram, one or more data modulation symbols and one or more ranging modulation symbols undergo processing to generate one or more OFDM symbols in the FDOM, as shown by reference numeral 350. The data modulation symbols may be included within first sub-carriers of an OFDM symbol, and the ranging modulation symbols may be included within second sub-carriers of the OFDM symbol. The one or more OFDM symbols undergo conversion from the FDOM to the TDOM such as by using an inverse fast Fourier transform (IFFT) process 360. Then, post-processing may be performed in the TDOM, as shown by reference numeral 370. Generally, certain operations are performed in the TDOM and certain other operations are performed in the FDOM so that a communication device can include a singular instantiation of an IFFT process 360.

Figure 4A:
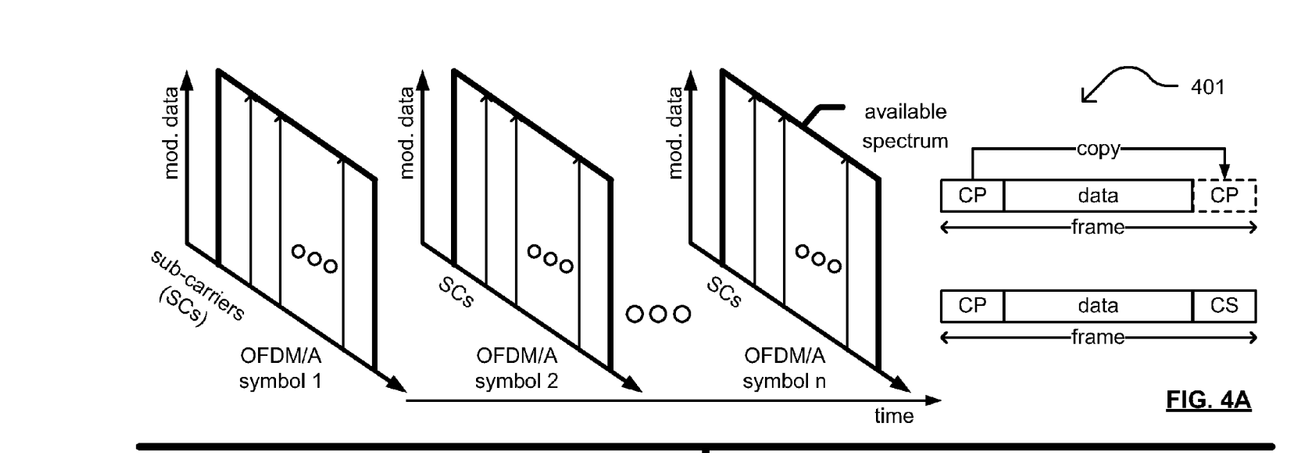
FIG. 4A is a diagram illustrating an example of orthogonal frequency division multiplexing (OFDM) and/or orthogonal frequency division multiple access (OFDMA).

FIG. 4A is a diagram illustrating an example 401 of orthogonal frequency division multiplexing (OFDM) and/or orthogonal frequency division multiple access (OFDMA). OFDM's modulation may be viewed a dividing up an available spectrum into a plurality of narrowband sub-carriers (e.g., relatively lower data rate carriers). Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data. For example, a processor of a communication device may be configured to perform forward error correction (FEC) and/or error correction code (ECC) of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, etc. The one or more coded bits may then undergo modulation or symbol mapping to generate modulation symbols. The modulation symbols may include both ranging and data modulation symbols. The ranging modulation symbols may be included within first one or more sub-carriers of an OFDM symbol, and the data modulation symbols may be included within second one or more sub-carriers of the OFDM symbol. Note also that while some OFDM symbols may include ranging and data information, other OFDM symbols may include only data information. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

Figure 4B:
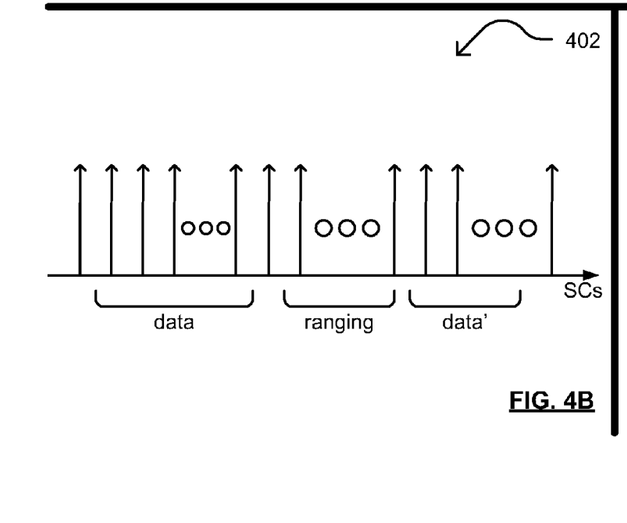
FIG. 4B is a diagram illustrating another example of OFDM and/or OFDMA.

FIG. 4B is a diagram illustrating another example 402 of OFDM and/or OFDMA. A transmitting device transmits modulation symbols of via the sub-carriers. OFDM and/or OFDMA modulation may operate by performing simultaneous transmission of a large number of narrowband carriers (or multi-tones). A guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a CP (Cyclic Prefix) and/or cyclic suffix (CS) (shown in right hand side of FIG. 4A) that may be a copy of the CP may also be employed within the guard interval to allow switching time, such as when jumping to a new communication channel or sub-channel, and to help maintain orthogonality of the OFDM and/or OFDMA symbols. Generally speaking, an OFDM and/or OFDMA system design is based on the expected delay spread within the communication system (e.g., the expected delay spread of the communication channel). The data modulation symbols may be included within first sub-carriers of an OFDM symbol that are located in between second sub-carriers of the OFDM symbol that include the ranging modulation symbols. Note that different data may be included in the sub-carriers to the left of the sub-carriers that include the ranging modulation symbols than data (shown as data') that is included in the sub-carriers to the right of the sub-carriers that include the ranging modulation symbols.

Figure 4C:
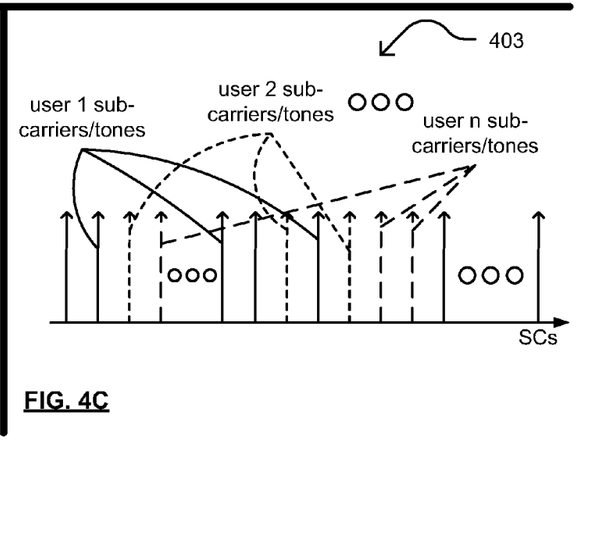
FIG. 4C is a diagram illustrating another example of OFDM and/or OFDMA.

FIG. 4C is a diagram illustrating another example 403 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of subcarriers to individual recipient devices for users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first frame, a second assignment for second frame, etc.). An OFDM frame may include more than one OFDM symbol. Similarly, an OFDMA frame may include more than one OFDMA symbol. In addition, such sub-carrier/tone assignment may be dynamic among different respective symbols within a given frame or superframe (e.g., a first assignment for a first OFDMA symbol within a frame, a second assignment for a second OFDMA symbol within the frame, etc.). Generally speaking, and OFDMA symbol is a particular type of OFDM symbol, and general reference to OFDM symbol herein includes both OFDM and OFDMA symbols (and general reference to OFDM frame herein includes both OFDM and OFDMA frames).

Generally, a communication device may be configured to include a processor to generate one or more frames, such as OFDM and/or OFDMA frames, to be transmitted to one or more other communication devices such that at least one of those frames includes both ranging and data information. In addition, when operating based on an OFDMA implementation, different data and different ranging information may be included within an OFDMA frame for two or more recipient communication devices. Also, the communication device may be configured to perform certain operations in the FDOM and other operations in the TDOM.

Figure 5A:
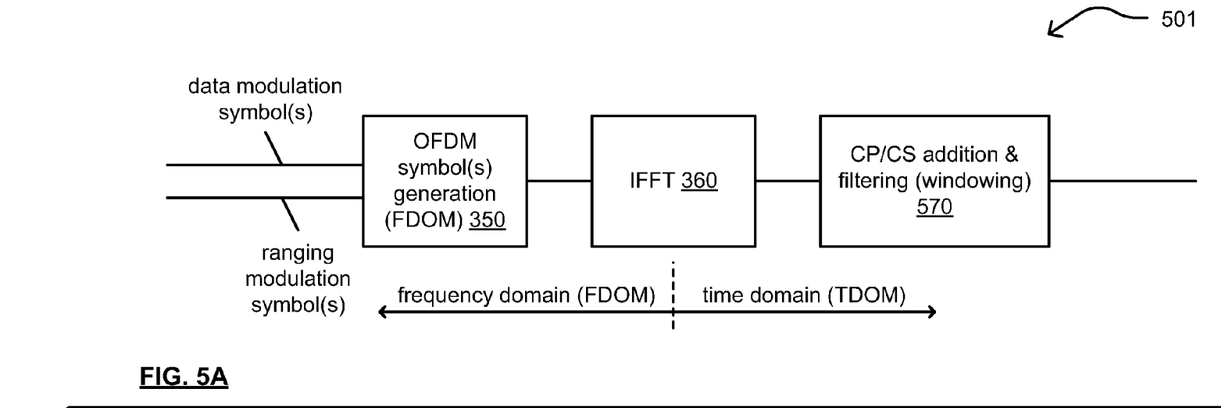
FIG. 5A is a diagram illustrating another example of the communication device that is operative within one or more communication systems.
Figure 5B:
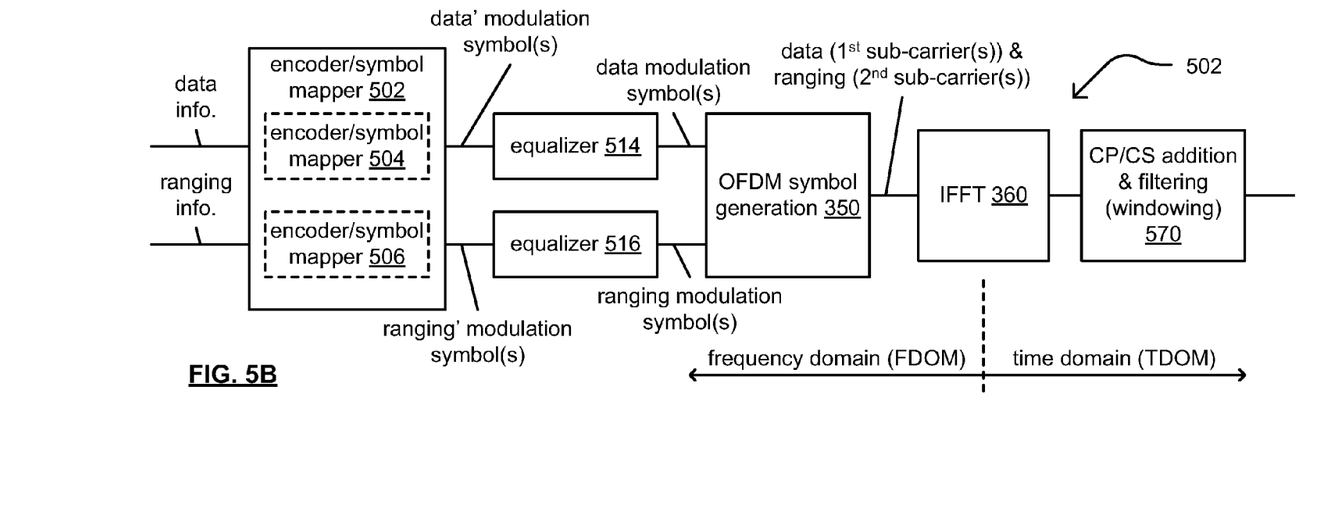
FIG. 5B is a diagram illustrating another example of the communication device that is operative within one or more communication systems.

The FIG. 5A and FIG. 5B have some similarities to the example 302 of FIG. 3B including performing certain operations in the FDOM and others in the TDOM that allow for a singular instantiation of an IFFT process 360.

FIG. 5A is a diagram illustrating another example 501 of the communication device that is operative within one or more communication systems. In this diagram, one or more data modulation symbols and one or more ranging modulation symbols undergo processing to generate one or more OFDM symbols in the FDOM, as shown by reference numeral 350 (e.g., that can include data modulation symbols within first sub-carriers of an OFDM symbol, and ranging modulation symbols within second sub-carriers of the OFDM symbol). The one or more OFDM symbols undergo conversion from the FDOM to the TDOM such as by using an inverse fast Fourier transform (IFFT) process 360. Then, cyclic prefix (CP) and cyclic suffix (CS) addition and filtering (e.g., windowing in the TDOM) are performed as shown by reference numeral 570.

FIG. 5B is a diagram illustrating another example 502 of the communication device that is operative within one or more communication systems. In this diagram, data information and ranging information undergo and coding and symbol mapping, as shown by reference 502. If desired, a first encoder/symbol mapper 504 may be configured to generate one or more data' modulation symbols, and a second encoder/symbol mapper 506 may be configured to generate one or more ranging' modulation symbols (where the indicator prime, or ', indicates modulation symbols before equalization for either data or ranging modulation symbols). Different respective encoding and/or modulation techniques may be used to generate the one or more data' modulation symbols and one or more ranging' modulation symbols, respectively.

An equalizer 514 processes the one or more data' modulation symbols using first pre-equalizer coefficients to generate one or more data modulation symbols, and an equalizer 516 processes the one or more ranging' modulation symbols using second pre-equalizer coefficients to generate one or more ranging' modulation symbols. The 'prime-notated' one or more data' modulation symbols and one or more data' modulation symbols may be viewed as those modulation symbols that have not yet undergone equalizer processing.

After having undergone equalizer processing, the one or more data modulation symbols and one or more ranging modulation symbols undergo processing to generate one or more OFDM symbols in the FDOM, as shown by reference numeral 350 (e.g., that can include data modulation symbols within first sub-carriers of an OFDM symbol, and ranging modulation symbols within second sub-carriers of the OFDM symbol). One or more OFDM symbol pairs may be generated in the FDOM. The one or more OFDM symbols (or one using first pre-equalizer coefficients) then undergo conversion from the FDOM to the TDOM such as by using an inverse fast Fourier transform (IFFT) process 360. Then, cyclic prefix (CP) and cyclic suffix (CS) addition and filtering (e.g., windowing in the TDOM) are performed as shown by reference numeral 570.

Communication device 110 may be implemented to include only a single instantiation of an IFFT process 360. The OFDM symbol or OFDM symbol pair generation is performed in the FDOM, and after undergoing conversion from the FDOM to the TDOM (e.g., using a single instantiation of an IFFT process 360), a single processing chain can perform additional post-processing as desired including CP and CS addition and filtering. Note that all processing is subsequently the same for both ranging and data information after having performed different equalizer processing using different pre-equalizer coefficients or sequences for each of the data' modulation symbols and ranging' modulation symbols generated by the encoder/symbol mapper 502 (or alternatively, separately by the encoder/symbol mappers 504 and 506).

Figure 6:
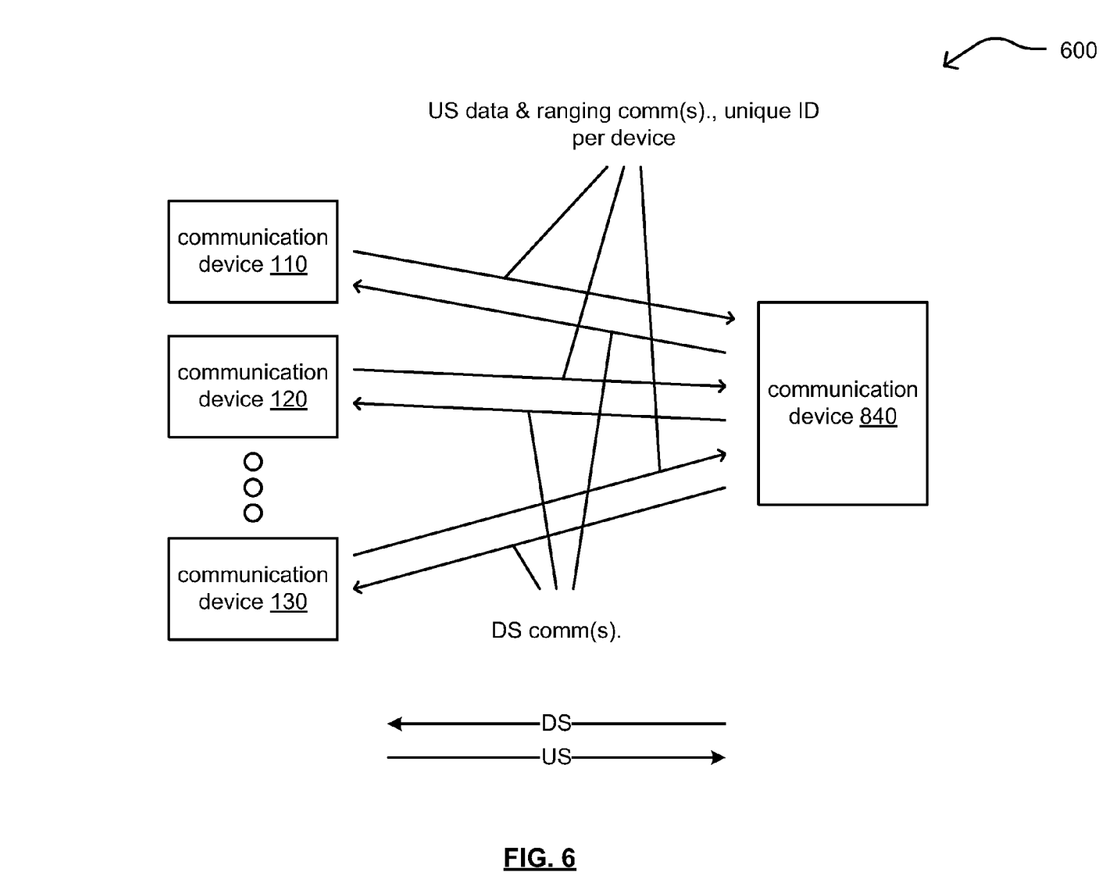
FIG. 6 is a diagram illustrating an example of upstream (US) and downstream (DS) communications between various communication devices within one or more communication systems.

FIG. 6 is a diagram illustrating an example 600 of upstream (US) and downstream (DS) communications between various communication devices within one or more communication systems. A number of different communication devices 110, 120, and/or up to 130 may be configured to transmit data and ranging communications upstream (US) to communication device 840. The devices 110-130 may be cable modems, and the device 840 may be a cable modem termination system (CMTS). Each of the devices 110-130 is configured to transmit data and ranging communications to device 840 that uniquely identify the transmitting device. For example, device 110 transmits a data and ranging signal to device 840 that uniquely identifies device 110, and device 120 transmits a different data and ranging signal to device 840 that uniquely identifies device 120. Device 840 then processes the different data and ranging signals from devices 110 and 120 to determine one or more characteristics of communication pathways between device 840 and devices 110 and 120, respectively, and one or more operational parameters for use in subsequent communications with devices 110 and 120. Device 840 then transmits one or more downstream (DS) communications to devices 110 and 120.

Device 110 may be configured to select a preamble sequence to identify itself from the other devices 120-130. Device 110 may also select one or more particular sub-carriers on which to transmit ranging and/or modulation symbols within one or more OFDM symbols. In certain implementations, the following rules may be used to construct preamble sequences for use by devices 110-130. For a given device, an appropriately selected preamble sequence, c, will have zero (or close to zero) cross-user interference and unified auto-correlation across frequency bins with other preamble sequence used by other devices:

$$c_u^{(m)}(q) = c_{u,t}(m)c_{u,f}(q) \quad \text{(Eq.)}$$

$$\sum_{m=0}^{M-1} c_{u,t}(m)c_{v,t}^*(m) = 0,$$

$$u \neq v,$$

where $$\sum_{m=0}^{M-1} c_{u,t}(m)c_{u,t}^*(m) = M,$$

$$|c_{u,f}(q)| = 1,$$

$$0 \leq q < N_c$$

$u$ = user $m$ = modulation symbol index $q$ = sub-carrier/frequency index

In the $1^{st}$ line of (Eq.) above, a 2-dimensional sequence is split into a TDOM portion (e.g., a given column for a particular user) and a FDOM portion (e.g., a row vector). In the $2^{nd}$ line of (Eq.) above, each preamble sequence is selected to be orthogonal to the other preamble sequences in the TDOM. Alternatively, such a preamble sequence can instead be constructed in the FDOM where they may be constructed using a same or common sequence. As long as the preamble sequences are orthogonal to each other in TDOM, then the preamble sequence(s) are possible candidate according to these design rules. In the $3^{rd}$ line of (Eq.) above, the auto-correlation of the symbol (TDOM) domain is equal to M, which is the sum up across M ranging slots, and the frequency sequence is shown as having unity amplitude (e.g., $|c_{u,f}(q)|=1$). A device may be configured to generate two or more preamble sequences for unique identification of two or more devices. The preamble sequences are selected such that they are orthogonal to one another in the TDOM, and so that interference between transmissions from different devices is eliminated or reduced.

Examples of preamble sequence selection are provided below based on the design rules described above. The matrix may be generated by multiplying a column time domain (TDOM) sequence by a row frequency domain (FDOM) sequence to generate two-dimensional (2-D) sequences. Each column of the matrix corresponds to a preamble sequence for a given user (e.g., device). For example, a first column of the matrix may be selected as the TDOM sequence for device 110, a second column of the matrix may be selected as the TDOM sequence for device 120, and so on. Ultimately, each user will then has a unique 2-D sequence covering both the TDOM and FDOM and also meet the properties or rules of (Eq.) above. An example of a preamble sequence satisfying the above-provided design rules is presented below.

EXAMPLE

A Hadamard sequence is adopted as a time domain (TDOM) sequence, since it has only 1, −1 value in the sequence, and this can be simply modulated through BPSK modulation. For illustration purposes, this example assumes M=8, then there are 8 orthogonal Hadamard sequences of length 8 as defined in the following matrix:

$$H = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}$$

The u-th column of matrix H above may be selected as the TDOM sequence for a given device (e.g., CM u). A designer has a great deal of flexibility to select a FDOM sequence. As one example, a Cazac sequence may be employed for tightness in time spreading. As another example, a pseudo-noise (PN) sequence of unit amplitude may be selected for simplicity. Note that different FDOM sequences or the same FDOM sequence can be adopted for all the users in the system. By maintaining orthogonality in the TDOM to differentiate between different users, a common FDOM sequence may be used for all the users in the system. However, different FDOM sequences may be used for different users in the system as well to provide for even greater differentiation among and between the users.

Figure 7:
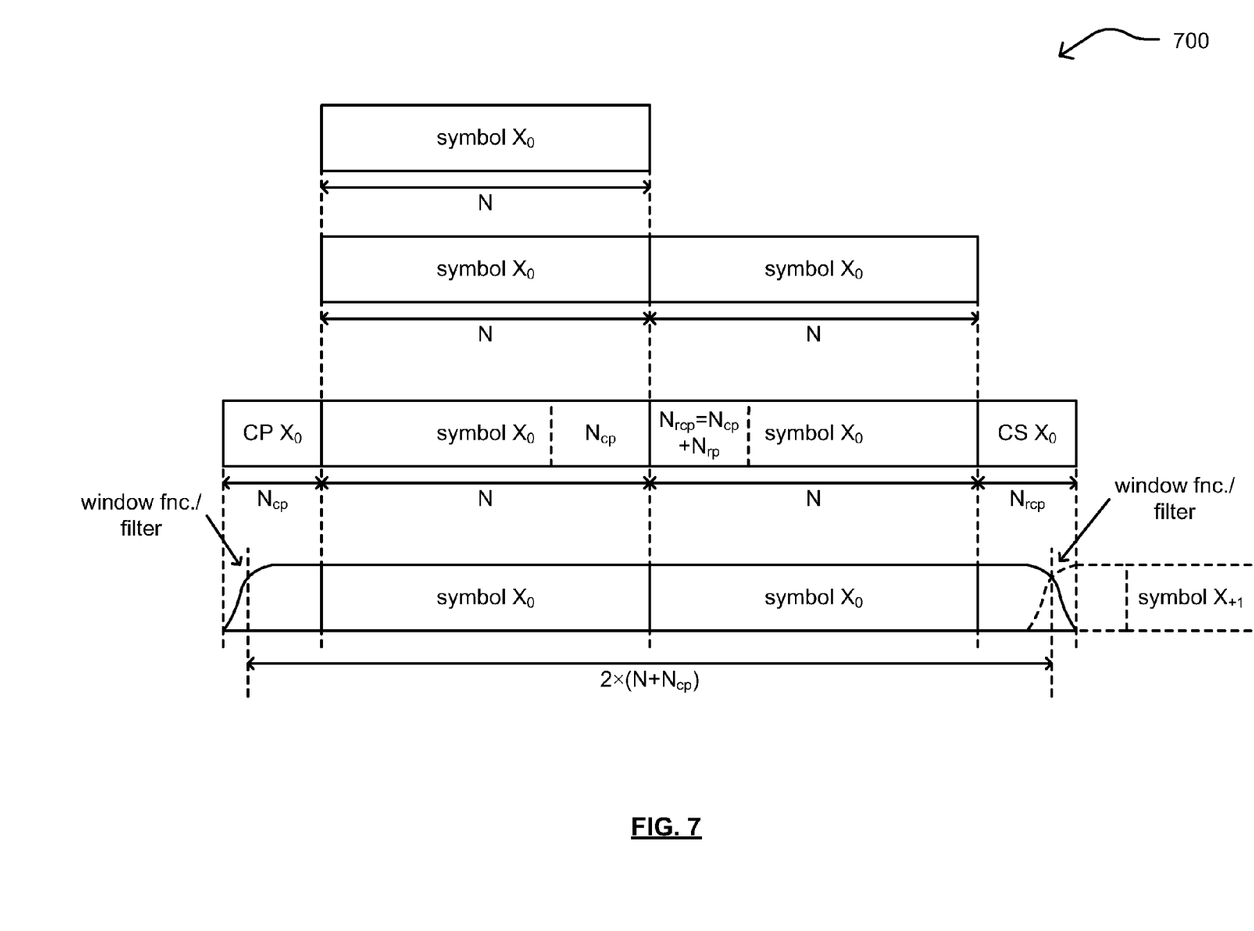
FIG. 7 is a diagram illustrating an example of ranging symbol pair structure.

FIG. 7 is a diagram illustrating an example 700 of ranging symbol pair structure. An OFDM symbol, $X_0$, includes ranging and/or data modulation symbols. The ranging modulation symbols may be included within first sub-carriers, and the data modulation symbols may be included within second sub-carriers. The sub-carriers that include the ranging modulation symbols may be contiguous and located in between two noncontiguous groups of sub-carriers that include the data modulation symbols. Note that some OFDM symbols may include both ranging and data information, while other OFDM symbols may include only data information.

In the FDOM, each transmitted symbol, $X_0$, is duplicated or repeated to generate a FDOM OFDM symbol pair. A first symbol (e.g., shown as left hand symbol $X_0$) is prepended with a Cyclic Prefix (shown as Cyclic Prefix, CP $X_0$) and a second identical symbol (e.g., shown as right hand symbol $X_0$) is post-pended with Cyclic Suffix (shown as Cyclic Suffix, CS $X_0$). The second symbol can be viewed as a circular shift of the first symbol by a CP length of samples. Note that a circular shift may be effectuated in the time domain by a frequency rotation. A circular shift may be effectuated by multiplying each subcarrier or tone, k, by the following:

$$c(k)=\exp(j*2*pi*k*CP\_length/FFT\_Size), \text{ or}$$

$$c(k)=e^{(j \times 2 \times \pi \times k \times CP\_length/FFT\_Size)}, \text{ where}$$

c=the coefficient to effectuate the circular shift
k=the sub-carrier index
CP_length=the length of the circular shift
FFT_Size=size of the fast Fourier transform (FFT) and/or inverse fast Fourier transform (IFFT)

Each ranging OFDM (or OFDMA) symbol is repeated twice. A cyclic prefix of Ncp samples is appended before the first repeated OFDMA symbol, and a cyclic suffix of Nrcp (e.g., Nrcp=Ncp+Nrp) samples is appended after the second repeated OFDM/A symbol. Nt corresponds to the number of samples associated with the window function. Nrp corresponds to the number of the roll off samples associated with the window function.

Filtering is performed in time domain using a windowing function. The windowing function is similarly applied to OFDM (or OFDMA) symbols that include data and ranging information or those that include only data information. The window roll-off becomes unity after an overlap-add operation as the first Nrp samples of the second symbol are identical to the Nrp cyclic suffix samples of the first symbol. As such, the interface between the first and second symbols align with one another, as can be seen along the center of the diagram. Filtering using a window function also truncates a portion of the CP and CS at the opposite ends of the symbol pair.

The duplication or repetition of the symbol, $X_0$, is performed in the FDOM. The resulting FDOM OFDM symbol pair is then converted from the FDOM to the TDOM to generate a TDOM OFDM symbol pair. The CP and CS additions to the TDOM OFDM symbol pair are performed in the TDOM, and the filtering using the window function are also performed in the TDOM to generate a filtered TDOM OFDM symbol pair. The resulting filtered TDOM OFDM symbol pair is then transmitted to another communication device for use in ranging operations.

Figure 8:
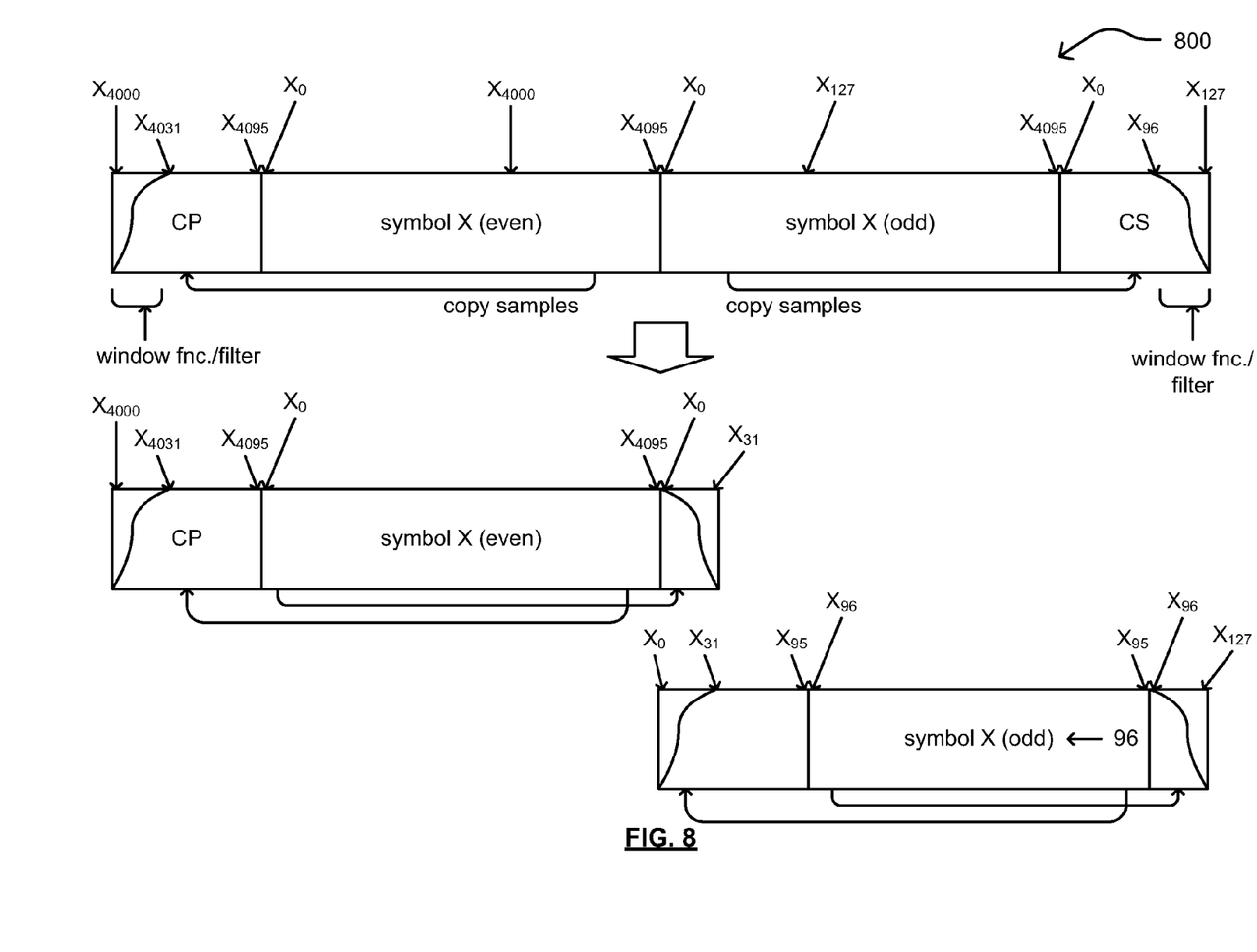
FIG. 8 is a diagram illustrating another example of ranging symbol pair structure.

FIG. 8 is a diagram illustrating another example 800 of ranging symbol pair structure. This example 800 operates using an IFFT of size 4,000, Ncp=96, and Nrp=32. This diagram also shows an OFDM symbol pair generated from an OFDM symbol, X, that includes 4096 sub-carriers (e.g., shown as $X_0$ to $X_{4095}$). The CP to the first symbol (e.g., shown as left hand symbol X (even)) is generated from copying the samples associated with Ncp=96 sub-carriers (e.g., shown as $X_{4000}$ to $X_{4095}$). Note that these samples are copied from the last and right-hand-most sub-carriers of the first symbol. The CS to the second symbol (e.g., shown as right hand symbol X (odd)) is generated from copying the samples associated with Nrcp=128 sub-carriers (e.g., shown as $X_0$ to $X_{127}$). Note that these samples are copied from the first and left-hand-most sub-carriers of the second symbol.

Then, additional translation and data processing is performed using the window function, with Nrp=32. The samples associated with first Nrp=32 sub-carriers that are appended to the right hand side of the first symbol (e.g., left hand symbol X (even)) and the samples associated with first Ncp=96 sub-carriers of the CS that are pre-pended at the beginning of the second symbol (e.g., right hand symbol X (odd)) become unity after the window roll-off filtering by the overlap-add operation as the first Nrp samples of the second symbol are identical to the Nrp cyclic suffix samples of the first symbol.

Figure 9A:
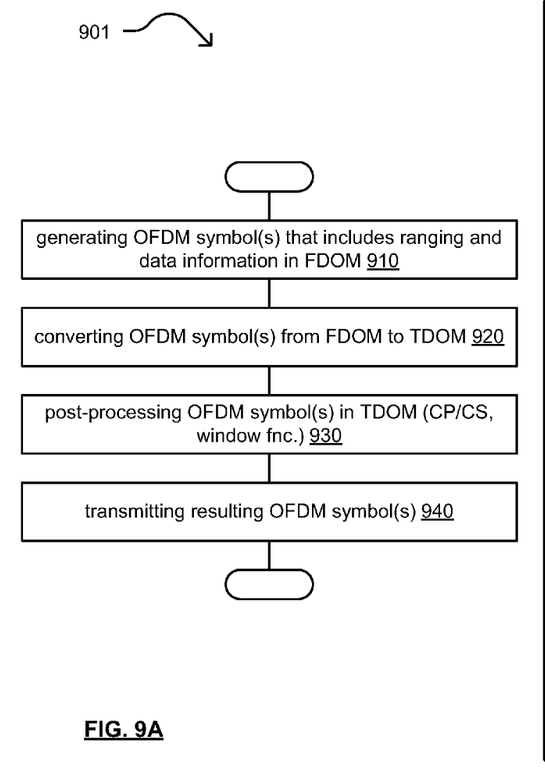
FIG. 9A is a diagram illustrating an embodiment of a method for execution by one or more communication devices.

FIG. 9A is a diagram illustrating an embodiment of a method 901 for execution by one or more communication devices. The method 901 begins by generating, in the frequency domain (FDOM), one or more OFDM symbols that include ranging and data information (block 910). Note that some OFDM symbols may include both ranging and data information while other OFDM symbols may include only data information. Two or more OFDM symbols may be arranged as an OFDM frame.

The method 901 continues by converting the one or more OFDM symbols from the FDOM to the time domain (TDOM) (block 920). The method 901 then operates by performing any post-processing of the one or more OFDM symbols in the TDOM (block 930). One example of such post-processing may include pre-pending and post-pending CP and CS, respectively. Another example of such post-processing may include filtering using a window function.

The method 901 continues by transmitting the resulting one or more OFDM symbols (block 940). This transmission may be made from a first communication device to a second communication device. In one sample, this transmission may be made from a cable modem to a CMTS.

Figure 9B:
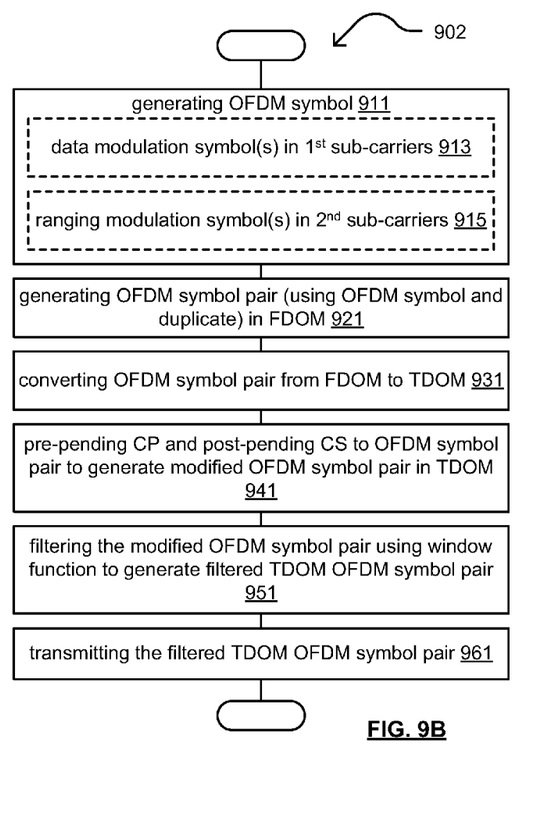
FIG. 9B is a diagram illustrating another embodiment of a method for execution by one or more communication devices.

FIG. 9B is a diagram illustrating another embodiment of a method 902 for execution by one or more communication devices. The method 902 begins by generating an orthogonal frequency division multiplexing (OFDM) symbol (block 911). The OFDM symbol can include one or more data modulation symbols within first one or more sub-carriers (block 913) and one or more ranging modulation symbols within second one or more sub-carriers (block 915).

Then, in the frequency domain, the method 901 continues by generating a frequency domain OFDM symbol pair using the OFDM symbol and a duplicate of the OFDM symbol (block 921). The method 901 continues by converting the frequency domain OFDM symbol pair to a time domain OFDM symbol pair (block 931).

The method 901 continues by pre-pending a cyclic prefix (CP) to and post-pending a cyclic suffix (CS) to the time domain OFDM symbol pair to generate a modified time domain OFDM symbol pair (block 941). The method 901 then operates by filtering the modified time domain OFDM symbol pair using a window function to generate a filtered time domain OFDM symbol pair (block 951).

The method 901 continues by transmitting the filtered time domain OFDM symbol pair (e.g., via a communication interface of the communication device) (block 961).

In the method 902, symbol duplication is performed in the FDOM while the CP/CS addition and filtering (using the window function) are performed in the TDOM.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A communication device comprising:
a communication interface; and
a processor, the processor and the communication configured to:
generate an orthogonal frequency division multiplexing (OFDM) symbol that includes one or more data modulation symbols within first one or more sub-carriers and one or more ranging modulation symbols within second one or more sub-carriers;
generate in frequency domain a frequency domain OFDM symbol pair using the OFDM symbol and a duplicate of the OFDM symbol;
convert the frequency domain OFDM symbol pair to a time domain OFDM symbol pair;
pre-pend a cyclic prefix to and post-pend a cyclic suffix to the time domain OFDM symbol pair to generate a modified time domain OFDM symbol pair;
filter the modified time domain OFDM symbol pair using a window function to generate a filtered time domain OFDM symbol pair; and
transmit the filtered time domain OFDM symbol pair.

2. The communication device of claim 1 further comprising:
the processor and the communication interface configured to:
process other one or more data modulation symbols using first pre-equalizer coefficients to generate the one or more data modulation symbols; and
process other one or more ranging modulation symbols using second pre-equalizer coefficients to generate the one or more ranging modulation symbols.

3. The communication device of claim 1 further comprising:
the processor and the communication interface configured to:
generate the OFDM symbol as an orthogonal frequency division multiple access (OFDMA) symbol;
duplicate the OFDMA symbol in the frequency domain to generate a frequency domain OFDMA symbol pair;
convert the frequency domain OFDMA symbol pair to a time domain OFDMA symbol pair;
pre-pend a cyclic prefix to and post-pend a cyclic suffix to the time domain OFDMA symbol pair to generate a modified time domain OFDMA symbol pair;
filter the modified time domain OFDMA symbol pair using the window function to generate a filtered time domain OFDMA symbol pair;
generate an OFDMA frame that includes the filtered time domain OFDMA symbol pair; and
transmit the OFDMA frame.

4. The communication device of claim 1 further comprising:
the processor and the communication interface configured to:
generate another OFDM symbol that includes one or more additional data modulation symbols;
duplicate the another OFDM symbol in the frequency domain to generate another frequency domain OFDM symbol pair;
convert the another frequency domain OFDM symbol pair to another time domain OFDM symbol pair;
pre-pend another cyclic prefix to and post-pend another cyclic suffix to the another time domain OFDM symbol pair to generate another modified time domain OFDM symbol pair;
filter the another modified time domain OFDM symbol pair using the window function to generate another filtered time domain OFDM symbol pair;
generate an OFDM frame that includes the filtered time domain OFDM symbol pair and the another filtered time domain OFDM symbol pair; and
transmit the OFDM frame.

5. The communication device of claim 1 further comprising:
the processor configured to:
select a preamble sequence to identify the communication device from one or more other communication device;
select the second one or more sub-carriers to eliminate or reduce interference between transmissions from the communication device and one or more other transmissions from the one or more other communication devices;
generate the one or more ranging modulation symbols using the selected preamble sequence; and
generate the OFDM symbol using the selected second one or more sub-carriers.

6. The communication device of claim 1 further comprising:
the processor configured to:
select a plurality of contiguous sub-carriers located at an end or beginning of the OFDM symbol as the cyclic prefix;
select a plurality of contiguous sub-carriers located at an end or beginning of the duplicate of the OFDM symbol as the cyclic suffix; and
filter at least some of the sub-carriers of the cyclic prefix and cyclic suffix using the window function to generate the modified time domain OFDM symbol pair.

7. The communication device of claim 1 further comprising:
a cable modem; and
the processor and the communication interface configured to transmit the filtered time domain OFDM symbol pair to a cable headend transmitter or a cable modem termination system (CMTS).

8. The communication device of claim 1 further comprising:
the processor and the communication interface configured to support communications within at least one of a satellite communication system, a wireless communication system, a wired communication system, a fiber-optic communication system, or a mobile communication system.

9. The communication device of claim 8 further comprising:
a cable modem; and
the processor and the communication interface configured to transmit the filtered time domain OFDM symbol pair to a cable headend transmitter or a cable modem termination system (CMTS).

10. A communication device comprising:
a communication interface; and
a processor, the processor and the communication configured to:
generate a first orthogonal frequency division multiple access (OFDMA) symbol that includes first one or more data modulation symbols within first one or more sub-carriers and one or more ranging modulation symbols within second one or more sub-carriers;
generate in frequency domain a first frequency domain OFDMA symbol pair using the first OFDMA symbol and a duplicate of the first OFDMA symbol;
convert the first frequency domain OFDMA symbol pair to a first time domain OFDMA symbol pair;
generate a second OFDMA symbol that includes second one or more data modulation symbols within the first and second one or more sub-carriers;
generate in the frequency domain a second frequency domain OFDMA symbol pair using the second OFDMA symbol and a duplicate of the second OFDMA symbol;
convert the second frequency domain OFDMA symbol pair to a second time domain OFDMA symbol pair;
generate an OFDMA frame that includes the first and second time domain OFDMA symbol pairs; and
transmit the OFDMA frame.

11. The communication device of claim 10 further comprising:
the processor and the communication interface configured to:
pre-pend a cyclic prefix to and post-pend a cyclic suffix to the first time domain OFDMA symbol pair to generate a first modified time domain OFDMA symbol pair;
filter the first modified time domain OFDMA symbol pair using a window function to generate a first filtered time domain OFDMA symbol pair;
pre-pend another cyclic prefix to and post-pend another cyclic suffix to the second time domain OFDMA symbol pair to generate a second modified time domain OFDMA symbol pair;
filter the first modified time domain OFDMA symbol pair using the window function to generate a first filtered time domain OFDMA symbol pair;
generate another OFDMA frame that includes the first and second filtered time domain OFDMA symbol pairs; and
transmit the another OFDMA frame.

12. The communication device of claim 10 further comprising:
the processor and the communication interface configured to:
select a preamble sequence to identify the communication device from one or more other communication device;
select the second one or more sub-carriers to eliminate or reduce interference between transmissions from the communication device and one or more other transmissions from the one or more other communication devices;
generate the one or more ranging modulation symbols using the selected preamble sequence; and
generate the first OFDMA symbol using the selected second one or more sub-carriers.

13. The communication device of claim 10 further comprising:
the processor and the communication interface configured to support communications within at least one of a satellite communication system, a wireless communication system, a wired communication system, a fiber-optic communication system, or a mobile communication system.

14. A method for execution by a communication device, the method comprising:
generating an orthogonal frequency division multiplexing (OFDM) symbol that includes one or more data modulation symbols within first one or more sub-carriers and one or more ranging modulation symbols within second one or more sub-carriers;
in frequency domain, generating a frequency domain OFDM symbol pair using the OFDM symbol and a duplicate of the OFDM symbol;
converting the frequency domain OFDM symbol pair to a time domain OFDM symbol pair;
pre-pending a cyclic prefix to and post-pending a cyclic suffix to the time domain OFDM symbol pair to generate a modified time domain OFDM symbol pair;
filtering the modified time domain OFDM symbol pair using a window function to generate a filtered time domain OFDM symbol pair; and
transmitting the filtered time domain OFDM symbol pair via a communication interface of the communication device.

15. The method of claim 14 further comprising:
processing other one or more data modulation symbols using first pre-equalizer coefficients to generate the one or more data modulation symbols; and
processing other one or more ranging modulation symbols using second pre-equalizer coefficients to generate the one or more ranging modulation symbols.

16. The method of claim 14 further comprising:
generating the OFDM symbol as an orthogonal frequency division multiple access (OFDMA) symbol;
duplicating the OFDMA symbol in the frequency domain to generate a frequency domain OFDMA symbol pair;
converting the frequency domain OFDMA symbol pair to a time domain OFDMA symbol pair;
pre-pending a cyclic prefix to and post-pending a cyclic suffix to the time domain OFDMA symbol pair to generate a modified time domain OFDMA symbol pair;
filtering the modified time domain OFDMA symbol pair using the window function to generate a filtered time domain OFDMA symbol pair;
generating an OFDMA frame that includes the filtered time domain OFDMA symbol pair; and
transmitting the OFDMA frame via the communication interface of the communication device.

17. The method of claim 14 further comprising:
selecting a preamble sequence to identify the communication device from one or more other communication devices;
selecting the second one or more sub-carriers to eliminate or reduce interference between transmissions from the communication device and one or more other transmissions from the one or more other communication devices;
generating the one or more ranging modulation symbols using the selected preamble sequence; and
generating the OFDM symbol using the selected second one or more sub-carriers.

18. The method of claim 14 further comprising:
selecting a plurality of contiguous sub-carriers located at an end or beginning of the OFDM symbol as the cyclic prefix;
selecting a plurality of contiguous sub-carriers located at an end or beginning of the duplicate of the OFDM symbol as the cyclic suffix; and
filtering at least some of the sub-carriers of the cyclic prefix and cyclic suffix using the window function to generate the modified time domain OFDM symbol pair.

19. The method of claim 14, wherein the communication device is a cable modem, and further comprising:
    transmitting the filtered time domain OFDM symbol pair to a cable headend transmitter or a cable modem termination system (CMTS).

20. The method of claim 14 further comprising:
    operating the communication interface of the communication device to support communications within at least one of a satellite communication system, a wireless communication system, a wired communication system, a fiber-optic communication system, or a mobile communication system.

\* \* \* \* \*